(12) United States Patent  (10) Patent No.: US 7,392,978 B2
Carlitz et al.  (45) Date of Patent: Jul. 1, 2008

(54) WHEEL SUSPENSION WITH SPRING ADJUSTMENT FOR MOTOR VEHICLES

(75) Inventors: Andreas Carlitz, Stolberg (DE); Jörg Neubrand, Freudenberg (DE); Rolf Hengstenberg, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 27 days.

(21) Appl. No.: 11/295,099

(22) Filed: Dec. 6, 2005

(65) Prior Publication Data
US 2006/0131799 A1 Jun. 22, 2006

(30) Foreign Application Priority Data
Dec. 6, 2004 (DE) .................. 10 2004 058 698

(51) Int. Cl.
*F16F 3/07* (2006.01)
(52) U.S. Cl. .................. 267/221; 267/34; 280/5.515; 280/124.162; 280/124.136
(58) Field of Classification Search ............. 267/33–35, 267/64.25, 221; 280/5.5, 5.515, 124.162, 280/124.179, 124.135, 124.136, 124.151
See application file for complete search history.

(56) References Cited

U.S. PATENT DOCUMENTS

| | | | | |
|---|---|---|---|---|
| 3,958,654 A | * | 5/1976 | LeSalver et al. | 180/291 |
| 4,081,187 A | * | 3/1978 | Evertz et al. | 267/218 |
| 5,947,459 A | * | 9/1999 | Ducloux et al. | 267/221 |

* cited by examiner

Primary Examiner—Xuan Lan Nguyen

(57) ABSTRACT

A wheel suspension comprising a vehicle body, a wheel movably articulated on the vehicle body via a control arm assembly. A wheel carrier and at least one helical pressure spring which is supported on the vehicle body on the one hand and on the wheel carrier or the control arm assembly on the other hand. The spring stiffness of the vehicle body support referred to the wheel contact point of the wheel can be controlled so as to be variable. Use is made of a helical pressure spring assembly whose force action line deviates from the geometric spring center line. Furthermore, there are provided rotational means for the 3-dimensional adjustment of the force action line relative to the geometric spring center line.

13 Claims, 9 Drawing Sheets

WHEEL SUSPENSION WITH SPRING ADJUSTMENT FOR MOTOR VEHICLES

The invention relates to a wheel suspension comprising a vehicle body, a wheel movably articulated at said vehicle body via a control arm assembly. The wheel suspension includes a wheel carrier and at least one helical pressure spring which is supported on the vehicle body on the one hand and on the wheel carrier or the control arm assembly on the other hand. The spring stiffness of the vehicle body support with reference to a wheel contact point P of the wheel can be controlled so as to be variable. The 3-dimensional position of the force action line of the helical pressure spring is varied relative to the axis of rotation of the control arm assembly so that the transmission ratio of the force action line and of the wheel contact point is changed.

BACKGROUND OF THE INVENTION

From German Publication DE 25 38 103 A1 wheel suspensions are known wherein symmetrical helical pressure springs are eccentrically offset relative to the spring plates by means of which they are supported on the vehicle body and on the control arm assembly. The helical pressure springs in this case are conventional springs wherein the spring center line corresponds to the force action line of the spring. By effecting a motor-driven rotation of the spring plates there occurs a change in the spring stiffness of the vehicle body support relative to the wheel contact point. The spring stiffness of the spring itself remains unaffected. Said adjustment influences the effective lever arms, so that the vehicle suspension can be adjusted to be "softer" or "harder".

German Publication DE 37 07 085 A1 proposes wheel suspensions wherein the supporting points of a helical pressure spring relative to the vehicle body and/or relative to the wheel carrier and control arm assembly respectively can be translatorily displaced in a direction extending perpendicularly relative to the central axis of the respective spring plate. In this case the spring stiffness of the vehicle body support which is referred to the wheel contact point can be varied relative to the wheel in a controlled way. In addition, the spring stiffness of the spring itself remains unchanged. The desired effect is based on a change in the effective lever arms.

German Publications DE 37 43 450 C2 and DE 101 25 503 C1 propose wheel suspensions which use helical pressure springs whose force action lines form an angle with the spring central line. The wheel suspensions used are entirely of the McPherson type and as a result of the angular position selected between the force action line and the spring central line which can deviate only slightly from the axis of the respective spring strut, the transverse forces acting on the suspension of the spring strut are reduced. The deviation of the force action line from the spring central line in the built-in condition is achieved with the helical pressure springs in the untensioned condition in a radial view and follow an approximately S-shaped course. In a radial view, an S-shaped course is followed in a first view and a C-shaped course is followed in a second view extending perpendicularly relative thereto or an S-shaped course in a first view and, equally, an S-shaped view in a second view extending perpendicularly relative thereto.

As described in detail in German Publication DE 101 25 503 C1, the examples mentioned here are not the only technical possibilities for achieving a predetermined deviation of the spring center line from the force action line in the built-in condition in a wheel suspension. Other possibilities are referred to.

Again, as described in German Publication DE 101 25 503 C1, there is no standardized definition of the term spring center line of helical pressure springs. The description given therein of determining spring center lines of helical pressure springs will be repeated below.

A first method of determining the spring center line of helical pressure springs comprises first, the design of the enveloping jacket of the helical pressure spring and then, the design of an enveloping jacket used to determine the center line of the enveloping jacket wherein the center line is equated with the spring center line. At most, this method can only be used to a limited extent. It fails in those cases where there are spring coils with variable coil diameters.

A further method of determining the spring center line of helical pressure springs comprises arithmetic means using the coil points for determining the curvature centers of the spring coil and wherein the connection between the curvature centers of the spring coils is determined in this way to constitute the spring center line.

Finally, the spring center line of helical pressure springs can be determined in such a way that the projections of the individual spring coils are considered in one plane. The center of each spring coil is assumed to be the center of a circle which is made to approach the spring coil and the centers of the spring coils obtained in this way are connected to one another.

When reference is made to the spring center lines of helical pressure springs, it depends on the degree of significance attached to the spring center lines for the spring action lines of helical pressure springs. If a helical pressure spring comprises a straight spring center line, the spring force action line, which of course is always a straight line, coincides with the spring center line. In the case of a helical pressure spring whose spring center line in the untensioned condition, the center line follows an approximately C-shaped course. The spring force action line, in the built-in condition, is displaced relative to the spring center line which, in the built-in condition, extends in a straight line (See German Publication DE 37 43 450 C2, FIG. 5). On the other hand, in the case of a helical pressure spring whose spring center line in the unloaded condition follows an approximately S-shaped course, the spring force action line in the built-in condition extends at an acute angle relative to the spring center line extending in a straight line in the built-in condition (See German Publication DE 37 43 450 C2, FIG. 6).

The force action line of the helical pressure spring is determined by the direction of the forces and counterforces of the vehicle body on the one hand and of the wheel carrier and control arm assembly on the other hand, relative to the spring plates on which the helical pressure spring is supported. The contact between the ends of the helical pressure spring and the spring plates is generally a multi-point contact, for example a three-point contact. However, linear contacts can also occur.

OBJECT OF THE INVENTION

On the basis of the above-mentioned state of the art, it is the object of the present invention to provide wheel suspensions which improve the possibilities of changing the spring stiffness of the vehicle body support with reference to the wheel contact point. Such possibilities of adaptation can be provided in the form of simple, possibly even manual possibilities for different load conditions of the vehicle. However, the greatest importance is attached to filly active chassis systems which can be achieved with simple technical means by means of which the wheel suspensions, independently of one another, can be adapted to different driving conditions.

The objective is achieved by providing a wheel suspension comprising a vehicle body, a wheel movably articulated at said vehicle body via a control arm assembly and having a wheel carrier. At least one helical pressure spring is supported on the vehicle body on the one hand and on the wheel carrier or the control arm assembly on the other hand. The spring stiffness of the vehicle body support with reference to the wheel contact point P of the wheel can be controlled so as to be variable, wherein use is made of a deviation from the geometric spring center line. Rotational means are provided for the 3-dimensional adjustment of the force action line relative to the geometric spring center line.

SUMMARY OF THE INVENTION

In the basic form of the inventive wheel suspension, the helical pressure spring is not changed in shape when adjusted relative to the vehicle body. Only the position of the force action line relative to the geometric spring center line is changed. This means that as compared to the solutions known from the state of the art, the adjustment of the helical pressure spring does not require any additional installation space.

According to the requirements of the installation situation, it is proposed that the force action line encloses an angle with the geometric spring center line or that the force action line is offset in parallel relative to the spring center line. The methods proposed here make it possible to greatly intensify the effect of rotating the support of the helical pressure spring relative to prior art wheel suspensions. Use is made of conventional centric helical pressure springs which are arranged eccentrically, i.e. the effects on the vehicle body spring stiffness to be achieved with the respective rotational angles are more pronounced.

According to a practical application it is proposed more particularly, that the helical pressure spring, at its ends, is supported via spring plates relative to the vehicle body and relative to the wheel carrier or the control arm assembly respectively. Furthermore, it is proposed that at least one of the spring plates can be motor-driven. At least one of the motor-driven spring plates should be supported so as to be rotatable. To the extent that the respective second plate is fixed and the helical pressure spring is clamped into the spring plate by means of its respective end, additional effects of spring stiffening can be achieved in that the helical pressure spring, when being adjusted, is subjected to additional torsion. For normal applications, however, it is proposed that both spring plates be rotatably supported, with one rotatably driven by a driving motor.

If it is proposed that both spring plates are rotatably driven by a driving motor, provided the ends of the helical pressure spring are clamped in accordingly. The helical pressure spring at the spring plates can also be additionally torsioned, with an additional change in the spring stiffness of the spring itself being effected in addition to the spring stiffness referred to in the vehicle body.

Accordingly to an additional embodiment, it is proposed that at least one of the spring plates be adjustable so as to be tiltable around its longitudinal axis. In this way, in addition to the specified deviation from the spring center line towards the force action line, it is possible to achieve a change in the spring center line relative to the geometry of the wheel suspension. The effect generated by the rotation of the spring and referring to the force action line can be intensified by this adjustment.

According to a further additional embodiment it is proposed that at least one of the spring plates is driven so as to be translatorily displaceable perpendicularly relative to its central axis, as is known from the initially mentioned state of the art. Said adjustment also changes the geometry of the wheel suspension as a whole and exists as an additional effect to the changing of the body spring stiffness by rotating the spring.

According to a further complementary embodiment it is proposed that the helical pressure spring be supported on at least one rotatably driven spring plate so as to extend eccentrically relative to the axis of same also known from the state of the art. In this case, the change in the position of the spring relative to the wheel suspension is added as an additional possibility of adjustment to the effects achievable by a simple rotation of the spring. The arrangement of the helical pressure spring has to be selected to be such that the offset of the force action line relative to the spring center line and the offset of the spring center line relative to the axis of rotation of the spring plate are added up in order to increase the effect of the rotation of the spring plate.

In the untensioned condition, the helical pressure springs used comprise an S-shaped spring center line, as described in German Publication DE 37 43 450 C1 or the helical pressure spring comprises a spring center line curve which, in an untensioned condition, in a first view, is approximately S-shaped. In a second view perpendicular to the first view, the center line is approximately C-shaped and is in accordance with German Publication DE 101 25 503 C1.

The adjustment of the angular position of the helical pressure spring relative to the vehicle body is preferably controlled by an electronic control unit in such a way that, on the one hand, the spring stiffness is adjusted stationarily as a function of the respective vehicle load, for example in the loaded condition for observing a selectable body level. On the other hand, the effective body spring stiffness is changed dynamically from a stationary basic setting in such a way that it is changed and adapted for as constant a body position as possible with reference to the distance from the road surface and the body inclination under all driving conditions.

All the means described make it possible to achieve a fully active chassis by means of a classical steel spring system, with there being required only electronic sensor and control means as well as driving means in the form of an electric motor. The additional energy consumption can be kept low. In view of the normally already existing large number of sensors for the driving condition of a motor vehicle, the additional costs of the control means and the electric motor for driving the helical pressures springs are also low. The costs and the additional weight of a fully active chassis can be kept within limits.

Because only little space is required, it is possible to incorporate a fully active chassis in almost any existing type of vehicle without having to change greatly the existing axle design. It is also conceivable to incorporate the present invention into existing vehicles in the form of a retrofit kit with reduced functions, thus achieving at least the possibility of level regulation. The functional scope generally achievable with the present invention is not inferior to that of other fully active chassis systems available on the market.

Whereas it seems obvious to use electric motors for driving purposes, the use, instead, of pneumatic or hydraulic adjusting means for the helical pressure springs is not excluded.

Depending on the type of sensors and control electronics used, it is possible to achieve the following advantageous effects by means of the controllable wheel suspension in accordance with the invention:

The body roll angle when negotiating curves can be clearly reduced.

The starting angle and breaking drive angle can be fully compensated for within the range of normal longitudinal acceleration conditions.

The natural frequency of the rear axle can be kept constant independently of the load condition.

It is possible to achieve a complete balance of levels when changing the additional load.

The basic design of the helical pressure springs can be such that they are relatively soft because the level control and body roll angle can be compensated for by a controlled hardening of the vehicle body stiffness.

The soft basic design of the helical pressure springs permits driving comfort and driving safety to be improved.

An active roll balance (different setting of the helical pressure springs on both sides of the vehicle) allows the stabilizer of the vehicle to be given softer characteristics, which results in an improvement of the rolling comfort and driving safety.

By controlling the helical pressure springs separately on both sides of the vehicle, it is possible to avoid any repercussions on the opposite side of the vehicle, which occur in the case of a prior art torsion stabilizer.

The prior art torsion stabilizer can be eliminated, which results in an improvement of the rolling comfort.

The vehicles level (clearance from ground) can be increased for off-highway driving and driving on bad road surfaces.

For reducing the air resistance or for simplifying the loading process, the vehicle level can be set to be lowered considerably (reduction of clearance from ground).

The natural steering behavior of the vehicle can be influenced by a variable distribution of the roll moment.

An active toe-in can be influenced by changing the reaction forces (transverse forces) in the rubber bearings of the wheel suspension, with driving stabilization being improved in the process.

To protect pedestrians, the vehicle level (ground clearance) can be changed in the case of a crash.

The inventive wheel suspension, more particularly a fully active chassis with wheel suspensions as proposed by the invention for all vehicle wheels is characterized by a small number of components, a simple package and low energy consumption relative to other active chassis systems.

BRIEF DESCRIPTION OF THE DRAWINGS

Preferred embodiments of the invention are illustrated in the drawings and will be described below.

DETAILED DESCRIPTION OF THE INVENTION

Figure 1A:
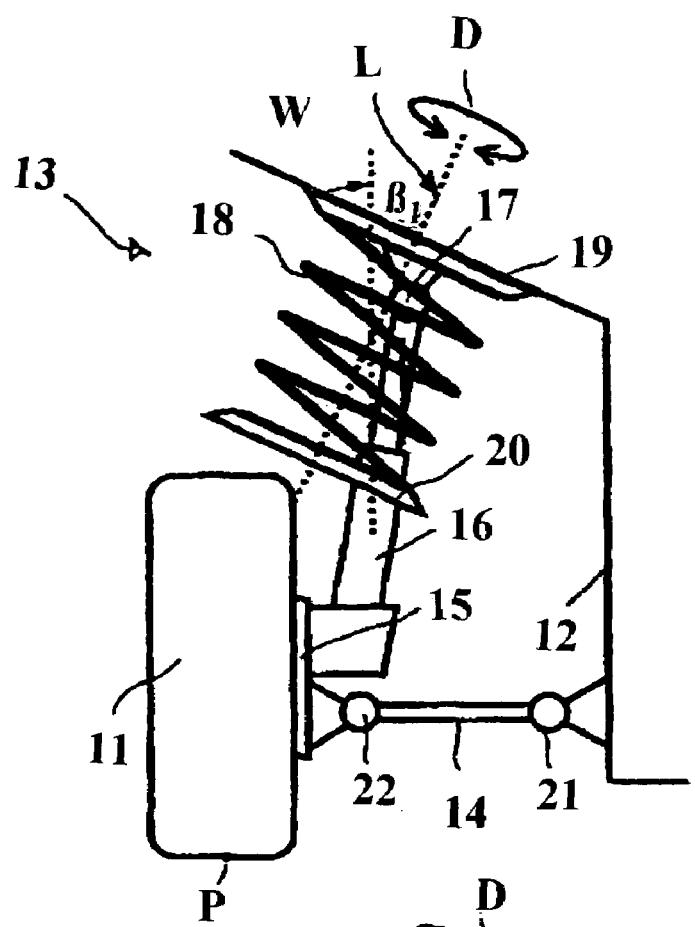
FIG. 1 illustrates the inventive wheel suspension having a McPherson spring strut
  a) in a starting position
  b) in a rotated position
Figure 1B:
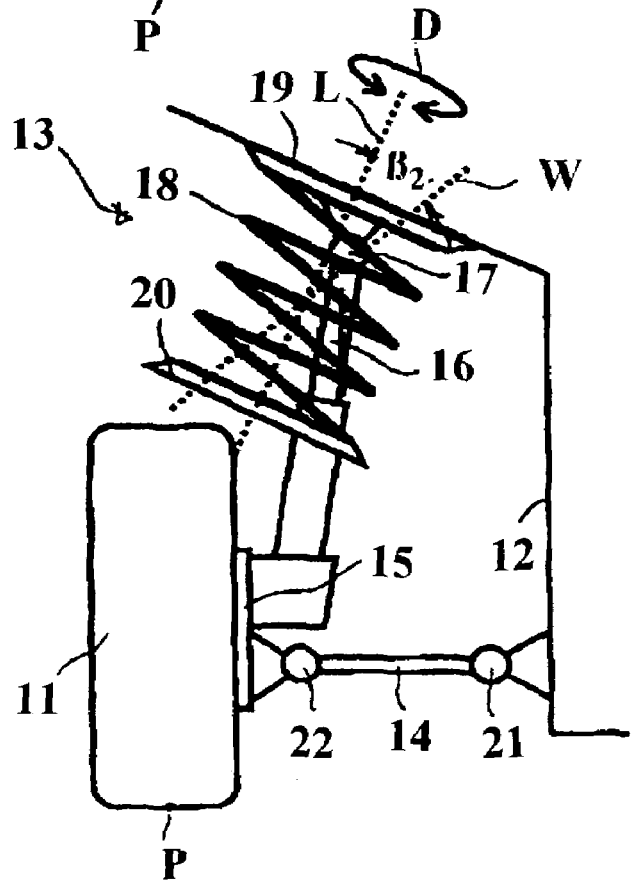

Illustrations a) and b) of FIG. 1 show a wheel suspension in a systematic illustration, giving a view of a wheel 11 in the longitudinal direction. There is also shown a vehicle body 12 to which the wheel 11 is connected via a McPherson spring strut assembly 13 and a lower transverse control arm 14. The McPherson spring strut 13 and the transverse control arm 14 directly engage a wheel carrier 15 which comprises the bearing means for the wheel. A driven wheel, can additionally accommodate a rotary driving joint. The McPherson spring strut assembly 13 comprises a telescopic damper 16 which, by means of its upper end, via a joint 17, more particularly a rubber joint, is secured to the vehicle body 12, while, at its lower end, the damper 16 is firmly connected to the wheel carrier 15. The damper 16 is positioned inside a helical pressure spring 18 which, via an upper spring plate 19 is supported on the vehicle body 12 and, via a lower spring plate 20 is supported on the wheel carrier 15. The transverse control arm 14 is connected via joints 21, 22 to the vehicle body 12 and to the wheel carrier 15. The geometric central longitudinal axis or geometric spring center line L of the helical pressure spring 18 passes through the spring plates 19, 20 approximately centrally. Because of the special way in which it is produced and its special shape in the untensioned condition, the effective axis or force action line W of the helical pressure spring 18 encloses an angle B with the longitudinal center line L. A rotary arrow D indicates the rotatability of the helical pressure spring 18 relative to the vehicle body 12. Whereas in illustration a), in a starting position, the angle $\beta_1$ between the central longitudinal axis L and the force action line W is shown to be negative. In illustration b), in an adjusted position, for example after the helical pressure spring has been rotated by 180° around the central longitudinal axis, the angle $\beta_2$ between the spring center line L and the force action line W is shown, in approximately the same size, to be positive in the opposite direction. A change in this angle results in a change in the spring stiffness of the support of the vehicle body 12, which spring stiffness is referred to the wheel contact point P.

Figure 2A:
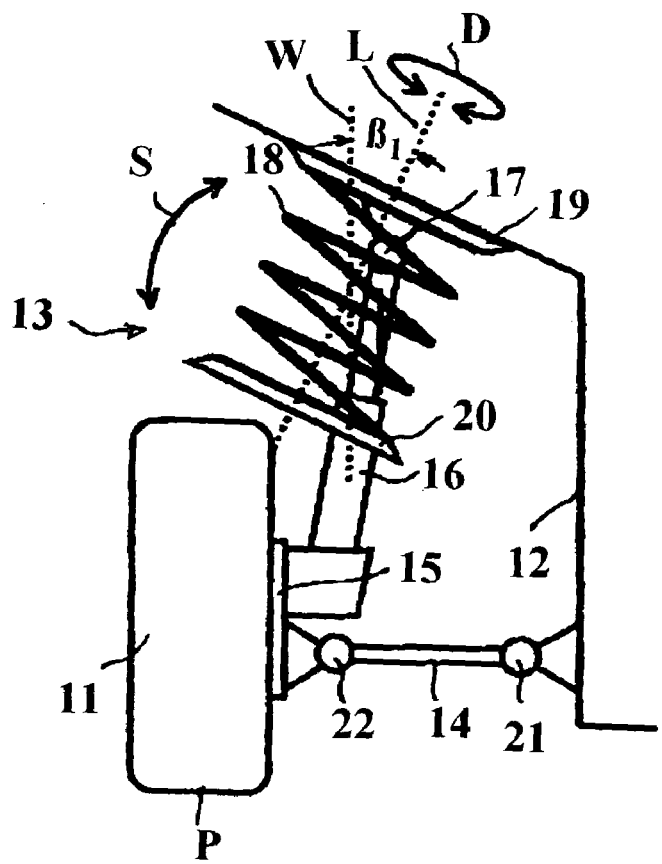
FIG. 2 illustrates the inventive wheel suspension with a McPherson spring strut
  a) in a starting position
  b) in a rotated and additionally tilted spring position.
Figure 2B:
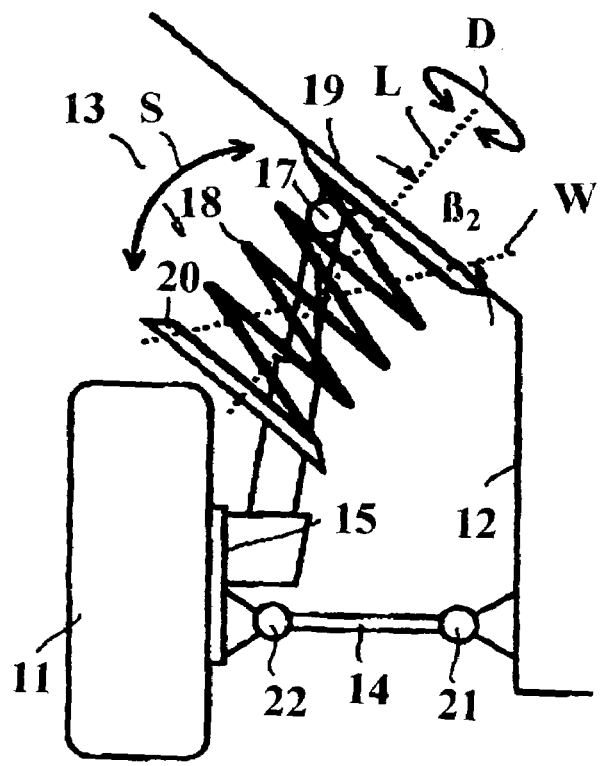

Illustrations a) and b) of FIG. 2 show a wheel suspension similar to that illustrated in FIG. 1 in a systematic illustration, giving a view of a wheel 11 in the longitudinal direction. Identical details have been given the same reference numbers as in FIG. 1. To that extent, reference is made to the description of FIG. 1. In this case, the geometric central longitudinal axis or geometric spring center line L passes through the spring plates 19, 20 approximately centrally. Because of the special way in which it is produced and its special shape in the untensioned condition, an effective axis or force action line W of the helical pressure spring 18 forms an angle β with the longitudinal center line L. A rotary arrow D indicates the rotatability of the helical pressure spring 18 relative to the vehicle body 12. Whereas in illustration a) the angle $β_1$ between the central longitudinal axis L and the force action line W is shown to be negative. In illustration b), after the helical pressure spring has been rotated by 180° around the central longitudinal axis, the angle $β_2$ between the spring center line L and the force action line W is shown, in approximately the same size, to be positive in the opposite direction. An additional pivot arrow S shows that by pivoting the spring plates 19, 20 from their starting position shown in illustration a) into an adjusted position shown in illustration b), the spring center line L is pivoted. The change in the position of the force action line W from its starting position according to illustration a) into the adjusted position according to illustration b) is increased by the measure of the pivot movement. As a result of the change in the position of the force action line W, there occurs a change in the spring stiffness of the vehicle body 12, referred to the wheel contact point. The spring stiffness of the support of the vehicle body relative to the wheel contact point P is changed by these means to an even greater extent.

Figure 3A:
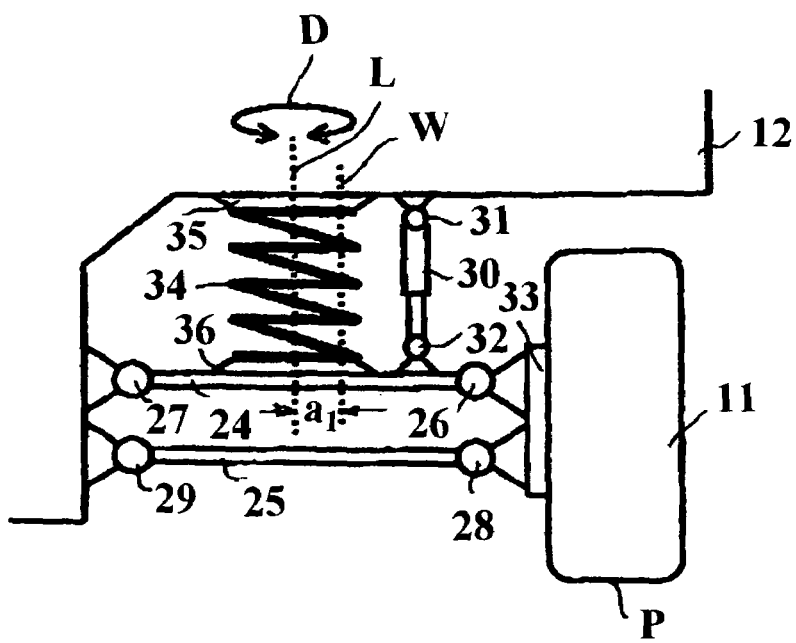
FIG. 3 illustrates the inventive wheel suspension with a double transverse control arm assembly
  a) in a starting position
  b) in a rotated spring position.
Figure 3B:
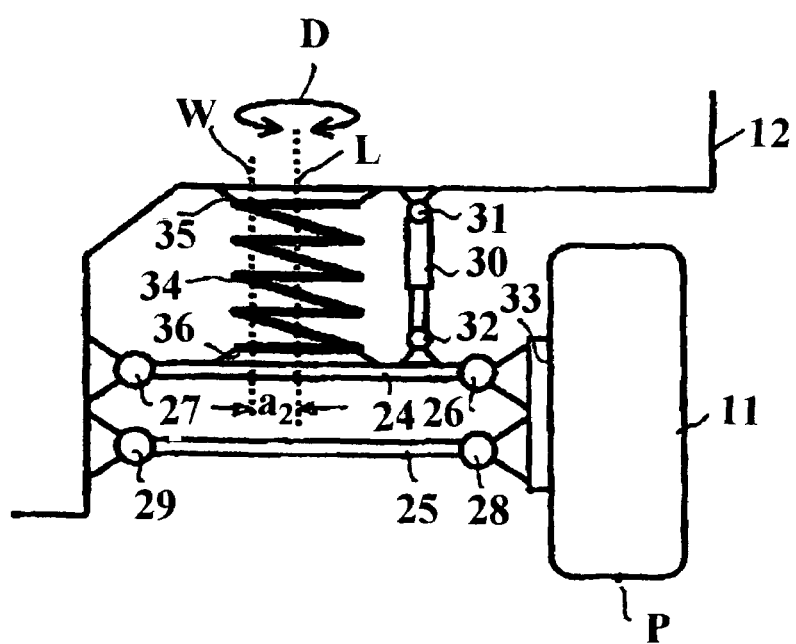

The two illustrations in FIG. 3 show a wheel suspension in a longitudinal view of a wheel 11 which is connected to a vehicle body 12 via two transverse control arms 24, 25. The transverse control arms link directly at a wheel carrier 33 via joints 26, 28 and at the vehicle body 12 via joints 27, 29. Between the upper transverse control arm 24 and the vehicle body 12 there is arranged a damper 30 which is connected to the vehicle body via an articulation point 31 and to the transverse control arm 24 via an articulation point 32. Furthermore, there is provided a helical pressure spring 34 which is supported via a spring plate 35 on the vehicle body 12 and via a spring plate 36 on the upper transverse control arm 24. The illustrations show the spring center line L as well as the force action line W of the helical pressure spring 34, which force action line W, due to the specific design of the spring, extends parallel to the spring center line L. Whereas illustration a) shows a starting position wherein the force action line W, with reference to the spring center line L, is displaced towards the wheel 11 by a distance $a_1$, illustration b) shows that for example by rotating the helical pressure spring 34 by 180°, according to a rotary arrow D, the force action line W is displaced by a distance $a_2$ towards the vehicle body and, respectively, towards the articulation points of the transverse control arms at the vehicle body. Because of the large lever arms, in illustration a), the spring stiffness of the vehicle body support relative to the wheel 11 is slight, whereas in illustration b), as a result of the short effective lever arms, there prevails a high spring stiffness of the vehicle body support relative to the wheel.

Figure 4A:
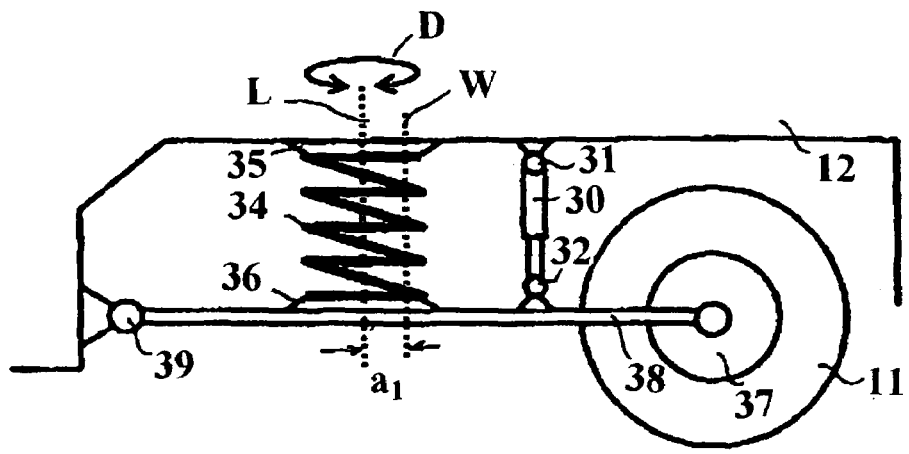
FIG. 4 illustrates the inventive wheel suspension with a longitudinal control arm assembly.
  a) in a starting position
  b) in a rotated spring position.
Figure 4B:
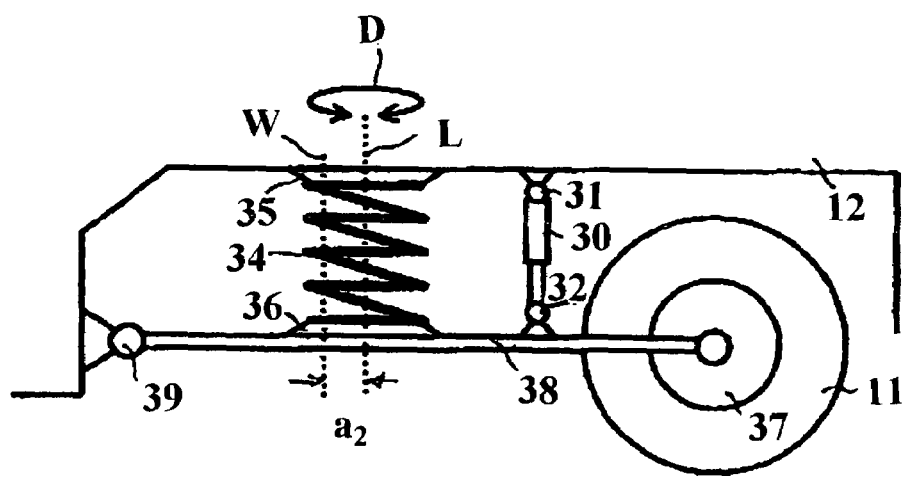

The two illustrations in FIG. 4 show a wheel suspension in a side view of a wheel 11 which is connected to a vehicle body 12 via a longitudinal control arm 38. The longitudinal control arm is rigidly connected to a wheel carrier 37 and acts at the vehicle body via a pivot axis 39. Between the longitudinal control arm 38 and the vehicle body 12, there is arranged a damper 30 which is connected to the vehicle body via an articulation point 31 and to the longitudinal control arm via an articulation point 32. Furthermore, there is provided a helical pressure spring 34 which is supported via a spring plate 35 on the vehicle body and via a spring plate 36 on the longitudinal control arm 38. The illustrations show the spring center line L as well as the force action line W of the helical pressure spring 34, which force action line W, due to the specific design, extends parallel to the spring center line L. Whereas illustration a) shows a starting position wherein the force action line W, with reference to the spring center line L, is displaced towards the wheel 11 by a distance $a_1$. Illustration b) shows that by rotating the helical pressure spring 34 by 180°, according to a rotary arrow D, the force action line W is displaced by a distance $a_2$ towards the vehicle body and, respectively, towards the articulation point of the longitudinal control arm at the vehicle body. Because of the large lever arms, in illustration a), the spring stiffness of the vehicle body support relative to the wheel is slight, whereas in illustration b), as a result of the short effective lever arms, there prevails a hard spring stiffness of the vehicle body support relative to the wheel 11.

Figure 5A:
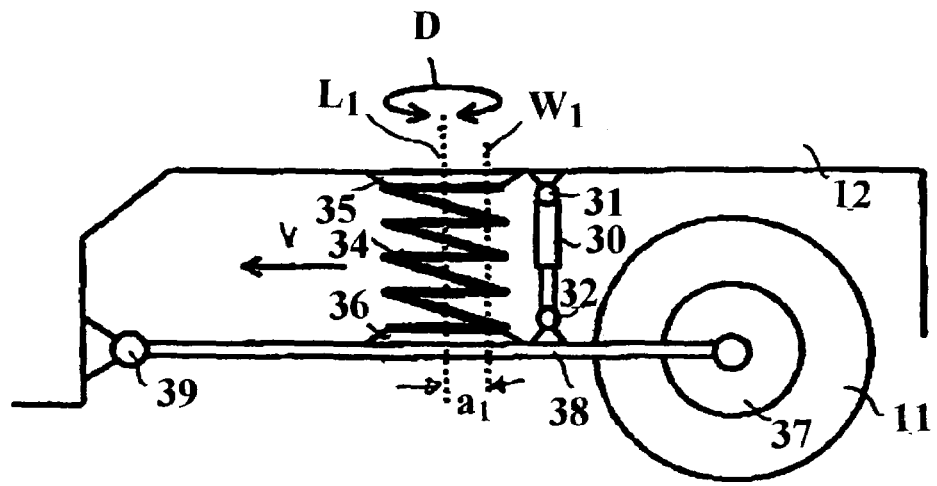
FIG. 5 illustrates the inventive wheel suspension with a longitudinal control arm assembly
  a) in a starting position
  b) in a rotated and translatorily displaced spring position.
Figure 5B:
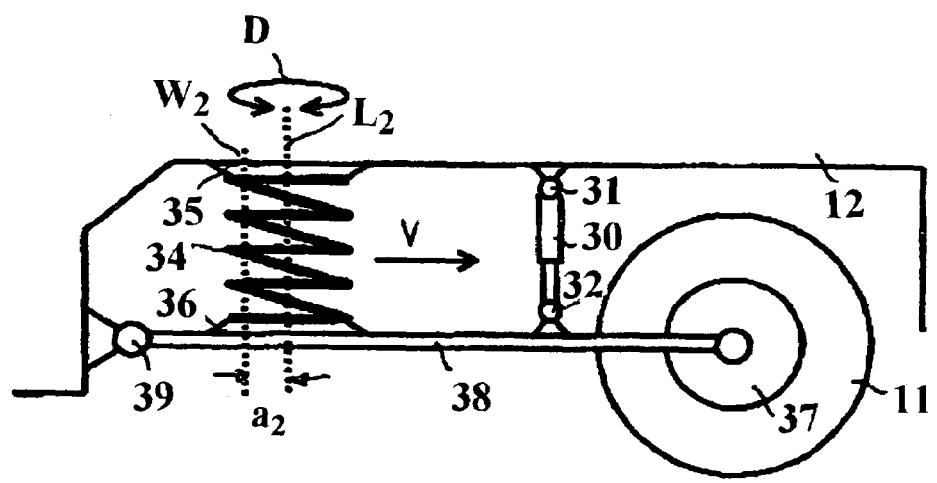

The two illustrations of FIG. 5 show a wheel suspension similar to that shown in FIG. 4 in a side view of the wheel 11. Identical details have been given the same reference numbers as in FIG. 4. To that extent, reference is made to the description of same The illustrations show the spring center line L as well as the force action line W of the helical pressure spring 34, which force action line W, due to the design of the spring, is displaced in parallel to the spring center line L. Illustration a) shows a starting position wherein the force action line $W_1$, with reference to the spring center line L, is placed towards the wheel 11 by distance $a_1$. Whereas illustration b) shows that by rotating the helical pressure spring by 180°, the force action line $W_2$ is displaced by a distance $a_2$ towards the articulation point of the longitudinal control arm at the vehicle body. A displacement arrow V indicates that the helical pressure spring 34, in addition to its above-described ability to be rotated, comprises a translatory displacement capability where the spring center line L can be displaced perpendicularly to its extension substantially in the longitudinal direction of the longitudinal control arm 38. In this way the effect generated by the rotation of the spring can be further intensified because the difference between the starting position of the force action line $W_1$ of the spring relative to the adjusted position of the force action line $W_2$ can be further increased by the translatory displacement. Because of the long lever arms, illustration a) shows a lesser spring stiffness in the vehicle body support relative to the wheel, whereas in illustration b), due to the short effective lever arms, there prevails a hard spring stiffness of the vehicle body support relative to the wheel.

Figure 6A:
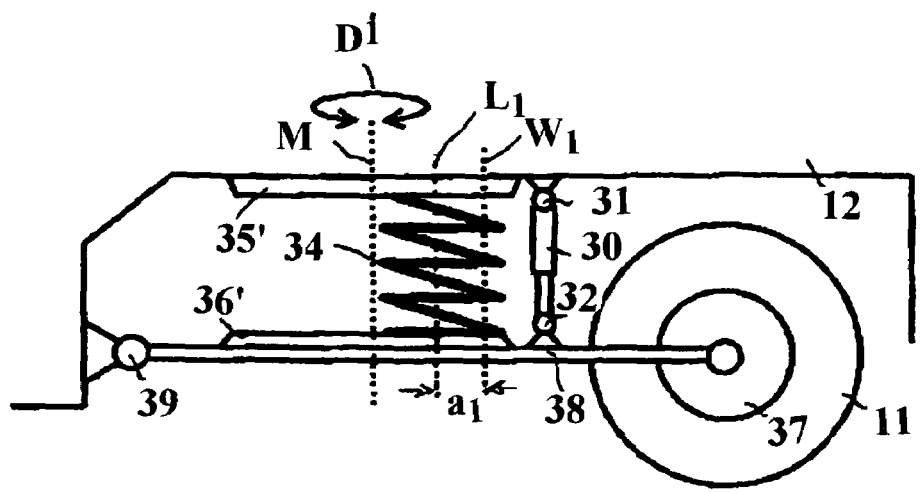
FIG. 6 illustrates the inventive wheel suspension with a longitudinal control arm assembly
  a) in a starting position
  b) in a rotated position of the eccentrically twistable spring.
Figure 6B:
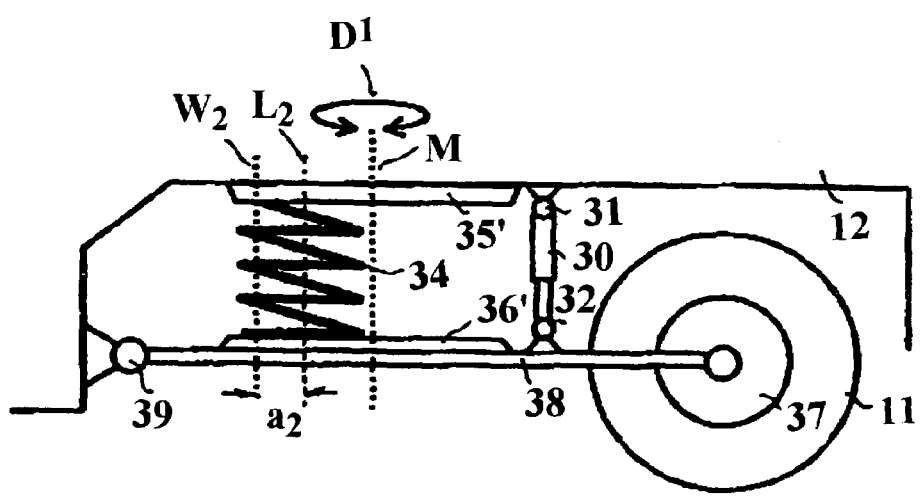

The two illustrations of FIG. 6 show a wheel suspension similar to that shown in FIG. 4 in a side view of the wheel 11. Identical details have been given the same reference numbers as in FIG. 4. To that extent, reference is made to the description of same. The illustrations show the spring center line L as well as the force action line W of the helical pressure spring 34, which force action line W, due to the design of the spring, is displaced in parallel to the spring center line L. Whereas illustration a) shows a starting position wherein the force action line $W_1$, with reference to the center line $L_1$, is displaced towards the wheel 11 by a distance $a_1$. Illustration b) also shows that by rotating the helical pressure spring by 180°, the force action line $W_2$ is displaced by a distance $a_2$ towards the articulation point of the longitudinal control arm at the vehicle body. It can be seen that the helical pressure spring 34 is arranged eccentrically relative to the spring plates 35', 36'. The rotation according to the rotary arrow D directly refers to the center axis M of the spring plate, with the longitudinal center line L of the helical pressure spring being adjusted directly by the rotation of the spring plates. As a result of the displaced arrangement of the force action line W relative to the spring center line L, the effect of the displacement relative to the longitudinal control arm is intensified even further as the helical pressure spring itself is rotated together with the spring plates 35', 36'. Because of the long lever arms, illustration a) shows a lesser spring stiffness in the vehicle body support relative to the wheel, whereas in illustration b), due to the short effective lever aims, there prevails a hard spring stiffness of the vehicle body support relative to the wheel.

Figure 7A:
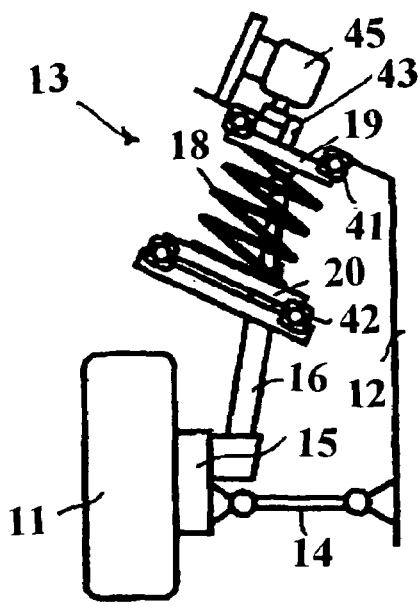
FIG. 7 illustrates a McPherson spring strut assembly according to FIGS. 1 and 2 with a motor-driven spring plate
  a) driving the upper spring plate
  b) driving the lower spring plate, namely
  c) driving both spring plates.
Figure 7B:
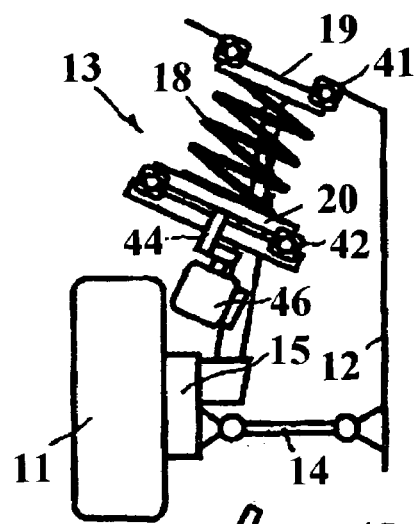
Figure 7C:
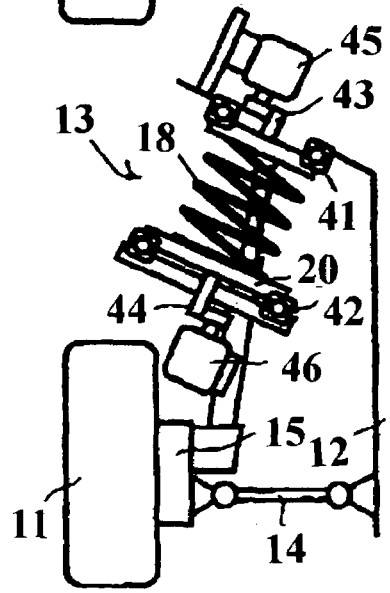

In FIG. 7, identical details have been given the same reference numbers as in FIGS. 1 and 2. To that extent, reference is made to the description of same. All illustrations a) to c) show axial bearing means 41, 42 for the spring plates 19, 20. In illustration a), a servomotor 45 acts on a rotary drive journal 43 of the spring plate 19. In illustration b) a servomotor 46 acts on a rotary drive journal 44 and in illustration c), a servomotor 45 acts on the rotary drive journal 43 of the spring plate 19 and a servomotor 46 acts on the rotary drive journal 44 of the spring plate 20.

Figure 8A:
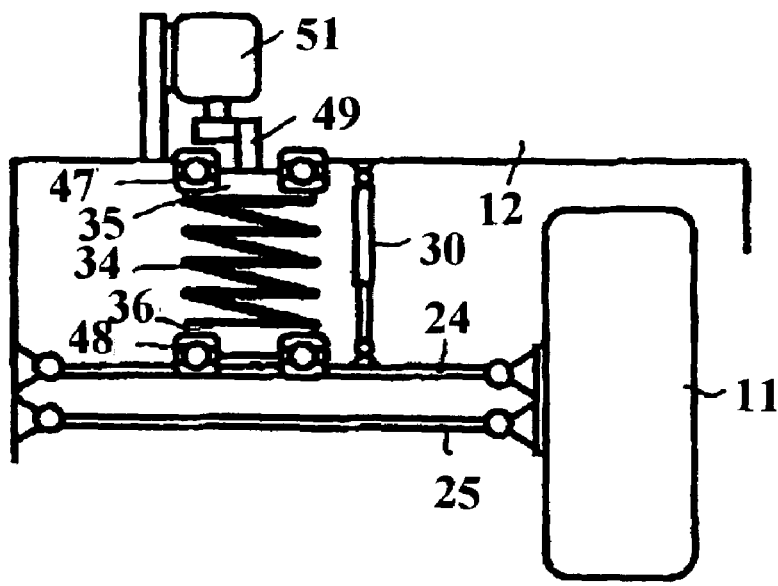
FIG. 8 illustrates a transverse control arm assembly according to FIG. 3 with motor-driven spring plates
  a) driving the upper spring plate
  b) driving the lower spring plate, namely
  c) driving both spring plates
Figure 8B:
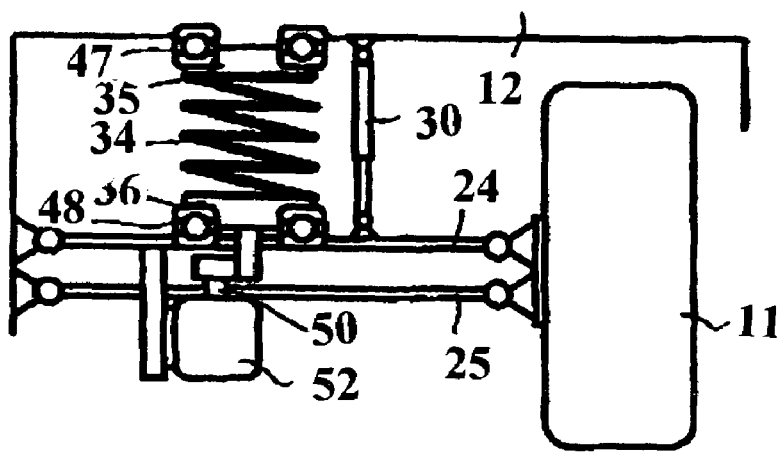
Figure 8C:
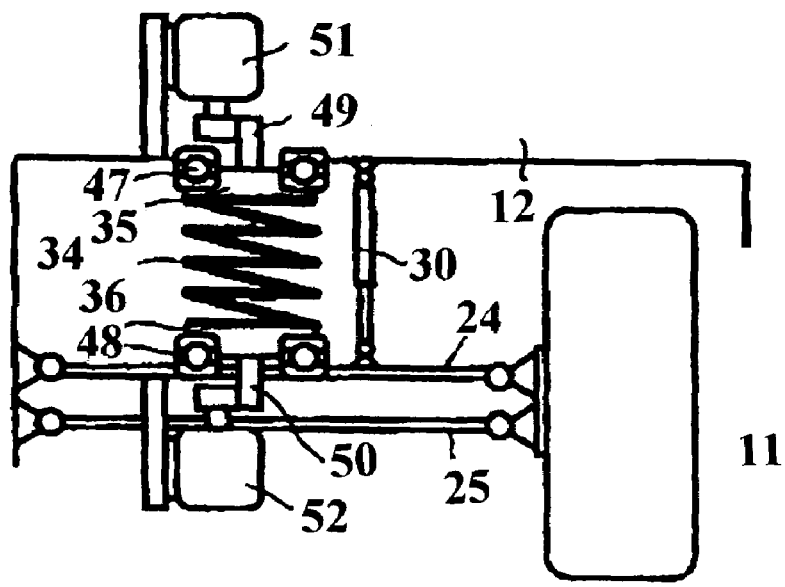

In FIG. 8, any details identical to those shown in FIG. 3 have been given the same reference numbers as in FIG. 3. To that extent, reference is made to the description of same. In all illustrations, the spring plates 35, 36 are rotatably supported by axial bearings 47, 48 relative to the vehicle body and the upper transverse control arm respectively. In illustration a), a servomotor 51 acts on a rotary drive journal 49 of the upper spring plate 35. In illustration b) a servomotor 52 acts on a rotary drive journal 50 of the lower spring plate 36 and in illustration c), servomotors 51, 52 act on both the rotary drive journals of the upper as well as of the lower spring plate 35, 36.

Figure 9A:
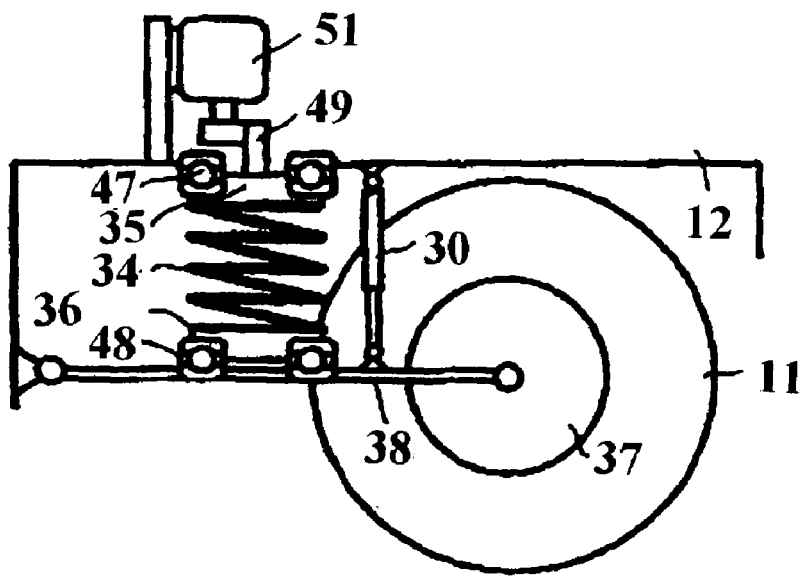
FIG. 9 illustrates a wheel suspension with a longitudinal control arm assembly or semi-trailing control arm assembly according to FIGS. 4 and 5 with motor-driven spring plates
  a) driving the upper spring plate
  b) driving the lower spring plate, namely
  c) driving both spring plates.
Figure 9B:
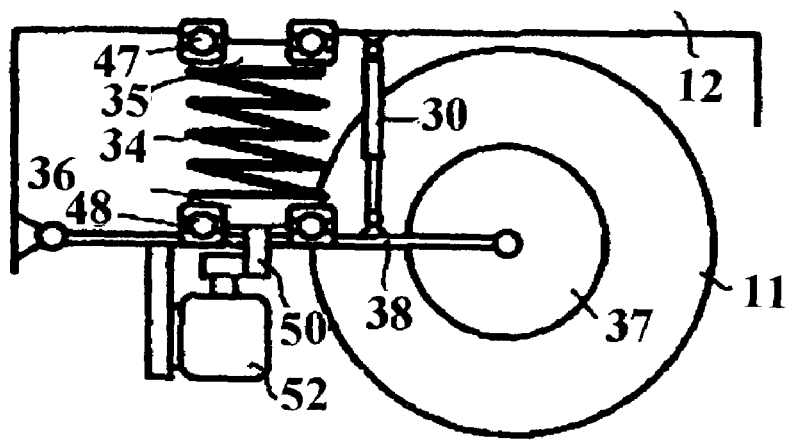
Figure 9C:
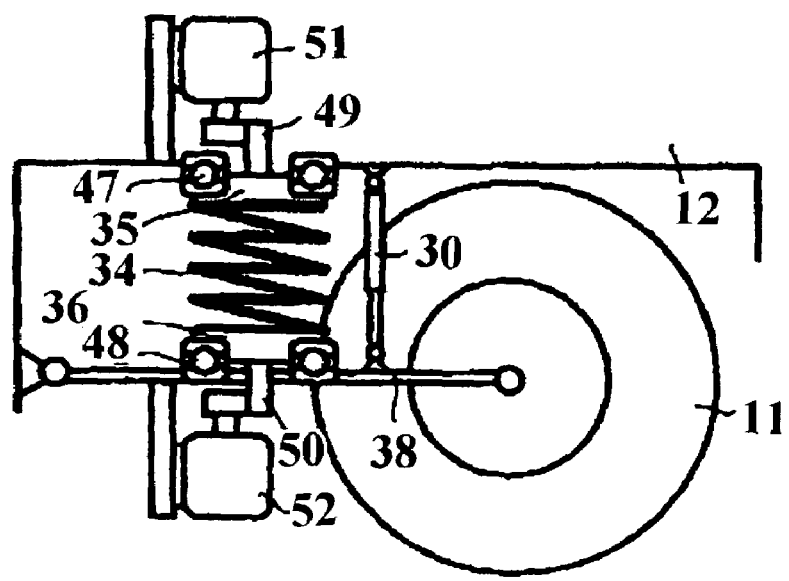

In FIG. 9, any details identical to those shown in FIG. 4 have been given the same reference numbers as in FIG. 4. In all illustrations, the spring plates 35, 36 are rotatably supported with axial bearings 47, 48 relative to the vehicle body and longitudinal control arm respectively. In illustration a), a servomotor 51 acts on a rotary drive journal of the upper spring plate 35. In illustration b) a servomotor 52 acts on a rotary drive journal of the lower spring plate 36 and in illustration c), servomotors 51, 52 act on both the rotary drive journals of the upper as well as of the lower spring plate 35, 36.

The invention claimed is:

1. A wheel suspension comprising a vehicle body, a wheel movably articulated on said vehicle body via a control arm assembly and having a wheel carrier, at least one helical pressure spring which is supported on said vehicle body on the one hand and on said wheel carrier or said control arm assembly on the other hand at a wheel contact point and wherein the helical pressure spring has a force action line which deviates from a geometric spring center line, and rotational means for the 3-dimensional adjustment of the force action line relative to the geometric spring center line by rotating the helical pressure spring around its geometric center line, whereby an effective spring stiffness between the vehicle body and the wheel contact point is variably controllable.

2. A wheel suspension according to claim 1, wherein said force action line encloses an angle with said geometric spring center line.

3. A wheel suspension according to claim 1, wherein said force action line is offset in parallel relative to said spring center line.

4. A wheel suspension according to any one of claims 1 to 3, wherein said helical pressure spring comprises a spring center line curve which is approximately S-shaped in an untensioned condition.

5. A wheel suspension according to any one of claims 1 to 3, wherein said helical pressure spring comprises a spring center line curve which, in an untensioned condition, in a first view, is approximately S-shaped and, in a second view perpendicularly to the first view, is approximately C-shaped.

6. A wheel suspension according to any one of claims 1 to 3, wherein said helical pressure spring in an untensioned condition, in a first view, has an approximately S-shaped curve and, in a second view perpendicular to the first view, also comprises an approximately S-shaped curved of the spring center line.

7. A wheel suspension according to any one of claims 1 to 3, wherein said wheel suspension is a transverse control arm assembly which comprises at least two transverse control arms which are positioned one above the other and which, around axes of rotation, are connected to said vehicle body on the one hand and to said wheel carrier on the other hand and wherein said helical pressure spring is supported on said vehicle body on the one hand and on a transverse control arm on the other hand.

8. A wheel suspension according to any one of claims 1 to 3, wherein said control arm assembly comprises a composite control arm assembly comprising at least one longitudinal control arm, wherein said at least one longitudinal control arm, around an axis of rotation, is connected to said vehicle body on the one hand and to the wheel carrier on the other hand, and wherein said helical pressure spring is supported on said vehicle body on the one hand and on said longitudinal control arms on the other hand.

9. A wheel suspension comprising a vehicle body, a wheel movably articulated on said vehicle body via a control arm assembly and having a wheel carrier, at least one helical pressure spring which is supported on said vehicle body on the one hand and on said wheel carrier or said control arm assembly on the other hand and wherein the helical pressure spring has a force action line which deviates from a geometric spring center lines and rotational means for the 3-dimensional adjustment of the force action line relative to the geometric spring center line by rotating the helical pressure spring around its geometric center line, wherein said force action line encloses an angle with said geometric spring center lines, wherein said force action line is offset in parallel relative to said spring center line and wherein said helical pressure spring includes a first end and a second end, and is supported via spring plates relative to said vehicle body at the first end and relative to said wheel carrier or said control arm assembly at the second end, whereby an effective spring stiffness between the vehicle body and the wheel contact point is variably controllable.

10. A wheel suspension according to claim 9, wherein at least one of said spring plates can be driven by a motor.

11. A wheel suspension according to any one of claims 9 and 10, wherein at least one of said spring plates which are drivable by a motor is rotatably supported.

12. A wheel suspension according to any one of claims 9 and 10, wherein at least one of said spring plates can be driven so as to be tiltable around the central axis of said spring plate.

13. A wheel suspension according to any one of claims 9 and 10, wherein at least one of said spring plates can be driven so as to be translatorily displaceable approximately perpendicularly relative to the central axis of said spring plate.

* * * * *